United States Patent
Foster

(10) Patent No.: US 8,702,378 B2
(45) Date of Patent: Apr. 22, 2014

(54) AIR FLOW PASSAGE LINER

(75) Inventor: Peter F. W. Foster, Burton on Trent (GB)

(73) Assignee: Rolls-Royce PLC, London (GB)

(*) Notice: Subject to any disclaimer, the term of this patent is extended or adjusted under 35 U.S.C. 154(b) by 763 days.

(21) Appl. No.: 12/897,270

(22) Filed: Oct. 4, 2010

(65) Prior Publication Data

US 2011/0126544 A1    Jun. 2, 2011

(30) Foreign Application Priority Data

Nov. 27, 2009   (GB) .................................. 0920741.6

(51) Int. Cl.
*F03D 11/00*    (2006.01)
(52) U.S. Cl.
USPC ........................................ 415/119; 415/170.1
(58) Field of Classification Search
USPC ................. 415/119, 170.1, 174.4, 173.1, 224
See application file for complete search history.

(56) References Cited

U.S. PATENT DOCUMENTS

| 5,743,488 A | 4/1998 | Rolston et al. |
| 2002/0179773 A1* | 12/2002 | Breer et al. ............... 244/134 R |
| 2006/0042225 A1 | 3/2006 | Bruno et al. |

FOREIGN PATENT DOCUMENTS

| EP | 1 860 301 A2 | 11/2007 |
| EP | 2 026 325 A2 | 2/2009 |
| GB | 2 401 769 A | 11/2004 |

OTHER PUBLICATIONS

British Search Report issued in Application No. 0920741.6; Dated Mar. 24, 2010.

* cited by examiner

*Primary Examiner* — Dwayne J White
(74) *Attorney, Agent, or Firm* — Oliff PLC

(57) ABSTRACT

A liner is provided for an air flow passage of a gas turbine engine. The liner comprises an acoustic attenuation layer which forms an air-washed surface of the flow passage, and a heat exchanger layer which extends as a backing to the acoustic attenuation layer. The heat exchanger layer is configured to carry a heated fluid flow and to transport heat from the fluid flow to the acoustic attenuation layer from where the heat is transferred to air flowing through the air flow passage.

10 Claims, 1 Drawing Sheet

AIR FLOW PASSAGE LINER

BACKGROUND

The present invention relates to a liner for an air flow passage of a gas turbine engine such as the bypass duct of a turbofan gas turbine engine.

The intake and bypass ducts of modern gas turbine engines are lined with acoustic attenuation panels that absorb sound energy and reduce the level of emitted noise. The panels usually work by resonating to the sound energy produced by the engine and dissipating the energy as heat into the air. A conventional acoustic attenuation panel has a perforated sheet which overlays a cellular honeycomb structure.

As well as producing noise, a gas turbine engine generates considerable heat. Cooling systems are needed to keep the components of the engine at operational temperatures. Specialised lubricants and oils are used to cool the components and are usually pumped around the engine in a recirculatory system. The lubricant leaving the hottest parts of the engine must be cooled to prevent overheating and degradation. For this purpose it is known to use a heat exchanger to transfer heat from the lubricant to either the fuel or to air passing through the engine. For example, a surface-air cooled, oil cooler (SACOC) can be mounted on an inner surface of a fan bypass duct. Such a cooler typically has a fin and plate construction with air fins both at inner and outer sides of the cooler and with the oil passing through a central plate in a cross-flow pattern. However, such coolers, while effective at removing heat from the oil, can disturb the flow of air through the duct, which can cause efficiency losses.

SUMMARY

Thus, in a first aspect of the invention there is provided a liner for an air flow passage of a gas turbine engine, the liner comprising:
  an acoustic attenuation layer which forms an air-washed surface of the flow passage, and
  a heat exchanger layer which extends as a backing to the acoustic attenuation layer, the heat exchanger layer being configured to carry a heated fluid flow and to transport heat from the fluid flow to the acoustic attenuation layer from where the heat is transferred to air flowing through the air flow passage.

In such a liner, heat can be transferred from the heated fluid flow to the air flow passage without compromising the acoustic attenuation properties of the acoustic attenuation layer. Indeed, the heat exchanger layer may also have acoustic attenuation properties. Furthermore, since the heat exchanger layer is beneath the acoustic attenuation layer, the heat exchanger layer does not disturb the air flow through the air flow passage, which can produce efficiency gains. Even though the heat exchanger layer extends as a backing to the acoustic attenuation layer, sufficient heat can be dissipated via the acoustic attenuation layer to adequately cool the heated fluid.

Although the heat transferred per unit area of the liner may be less than that of, for example, a conventional SACOC, as the liner typically produces much less drag than a conventional SACOC, the liner may compensate by covering a much larger surface area. Indeed, the surface area required by the liner may be less than or equal to the area which is in any event conventionally covered by acoustic attenuation panels.

The liner of the invention may have any one or, to the extent that they are compatible, any combination of the following optional features.

Typically, the liner is for lining an air flow passage of a turbofan gas turbine engine, such as a bypass duct of a turbofan gas turbine engine.

Typically, the heat exchanger layer of the liner is configured to carry a heated oil flow.

The heat exchanger layer may have a plurality of fins in contact with the heated fluid flow, the fins conducting heat from the heated fluid flow to the acoustic attenuation layer. The fins provide additional heat exchange surfaces that aid in the transfer of heat from the heated fluid flow to the acoustic attenuation layer. The fins typically define passageways therebetween for the heated fluid flow. For example, the fins may conveniently be formed by a corrugated sheet structure, although other fin arrangements may be adopted.

The fins may be attached to a backing sheet which is at the boundary between the heat exchanger layer and the acoustic attenuation layer. In this way, good thermal contact between the heat-exchanger layer and the acoustic attenuation layer can be achieved. The fins may be sandwiched between the backing sheet and a base sheet of the heat exchanger layer. This can provide a structure that has the strength to tolerate the potentially high pressure of the heated fluid flow.

Typically, the acoustic attenuation layer has a cellular honeycomb structure. The acoustic attenuation layer may further have a perforated sheet which overlays the cellular honeycomb structure to form the air-washed surface.

Advantageously, the combination of a heat exchanger layer having a plurality of fins and a heat exchanger layer having a cellular honeycomb structure may provide sufficient strength such that the liner can carry significant loads, allowing it to be an integral, load-bearing part of the engine.

To improve the conductive heat transfer through an acoustic attenuation layer having a cellular honeycomb structure, higher thermal conductivity materials and/or higher wall thicknesses may be used for the honeycomb structure than are typically used in conventional acoustic attenuation panels.

In a second aspect of the invention there is provided a gas turbine engine having an air flow passage lined with one or more liners according to the first aspect (the liners optionally having any one, or to the extent that they are compatible, any combination of the optional features of the first aspect). The engine may be a turbofan gas turbine engine and the lined air flow passage may be a bypass duct.

BRIEF DESCRIPTION OF THE DRAWINGS

An embodiment of the invention will now be described by way of example with reference to the accompanying drawings in which.

DETAILED DESCRIPTION

Figure 1:
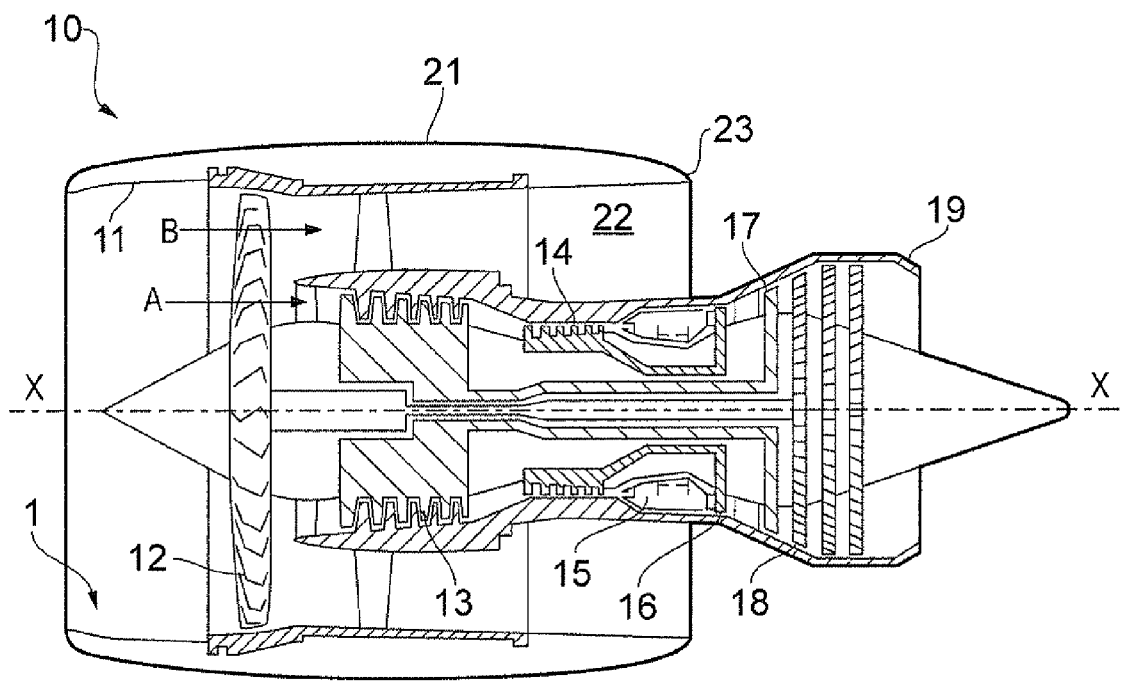
FIG. 1 shows schematically a longitudinal cross-section through a ducted fan gas turbine engine.

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 14 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Figure 2:
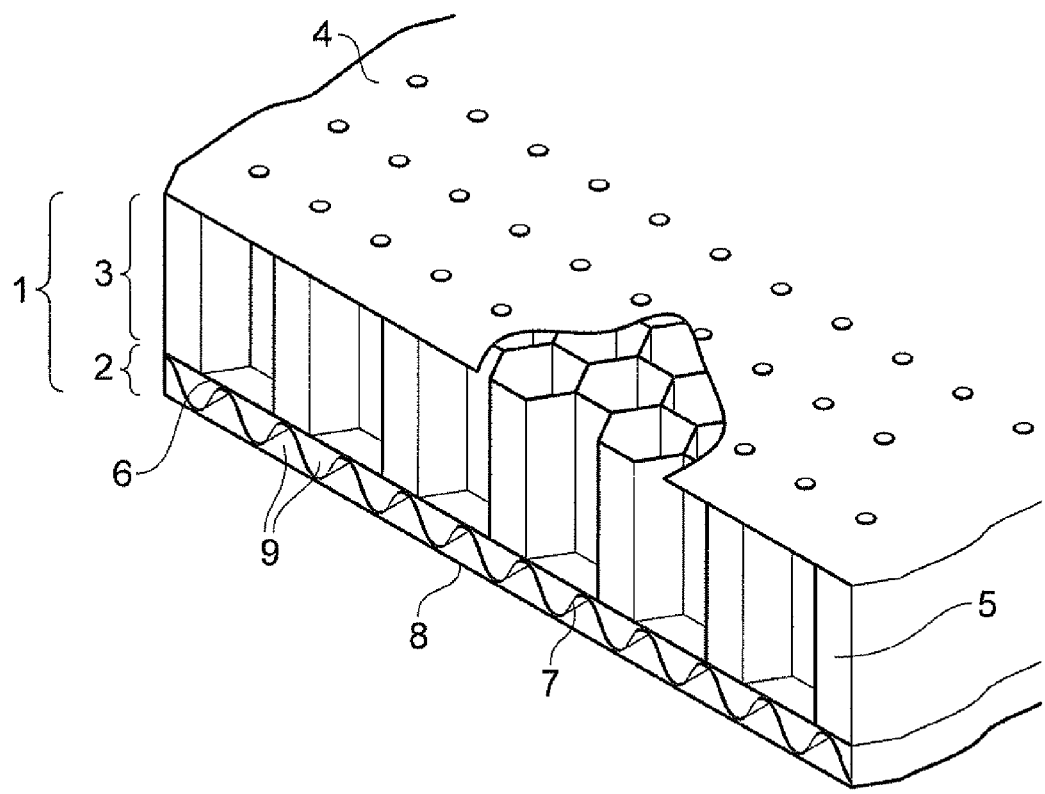
FIG. 2 shows a part cut-away perspective schematic view of a liner according to an embodiment of the invention.

FIG. 2 shows a liner 1 having a heat exchanger layer 2 that extends as a backing to an acoustic attenuation layer 3. The acoustic attenuation layer 3 comprises a perforated sheet 4 overlying a cellular honeycomb structure 5. A backing sheet 6 forms the boundary between the heat exchanger layer 2 and the acoustic attenuation layer 3, the walls of honeycomb structure 5 extending upwardly from the backing sheet. In the heat exchanger layer 2, a corrugated sheet 7 is sandwiched between the backing sheet 6 and a base sheet 8. Side-by-side passageways 9 for a flow of heated fluid are formed by the peaks and troughs of the corrugated sheet 7.

In use, the liner lines the air intake 11 and/or the bypass duct 22, for example, of the turbofan gas turbine engine. The perforated sheet 4 is air-washed by air flowing through the passage of the bypass duct. Heated oil flows through the passageways 9 in the heat exchanger layer 2. The sandwich structure of the heat exchanger layer has sufficient strength to tolerate the potentially high pressure of the heated oil flow. The undulations of the corrugated sheet 7 act as a plurality of fins extending between the backing sheet 6 and a base sheet 8. Heat is transferred from the heated oil flow to the fins and thence to the backing sheet 6, or directly to the backing sheet 6, and from there through the acoustic attenuation layer to be dissipated in the air flowing through the bypass duct. Thus the liner is able to simultaneously reduce the level of noise emitted from the engine and cool the oil flowing through the liner. The air-flow through the bypass duct is minimally disturbed because there are no fins protruding into the air flow.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A liner for an air flow passage of a gas turbine engine, the liner comprising:
    an acoustic attenuation layer which forms an air-washed surface of the flow passage, and
    a heat exchanger layer which extends as a backing to the acoustic attenuation layer, wherein
        the heat exchanger layer is configured to carry a heated fluid flow and to transport heat from the fluid flow to the acoustic attenuation layer from where the heat is transferred to air flowing through the air flow passage, and
        the heat exchanger layer has a plurality of fins in contact with the heated fluid flow, the fins conducting heat from the fluid flow to the acoustic attenuation layer.

2. A liner according to claim 1, which is for lining bypass duct of a turbofan gas turbine engine.

3. A liner according to claim 1, wherein the heat exchanger layer is configured to carry a heated oil flow.

4. A liner according to claim 1, wherein the fins are formed by a corrugated sheet structure.

5. A liner according to claim 1, wherein the fins are attached to a backing sheet which is at the boundary between the heat exchanger layer and the acoustic attenuation layer.

6. A liner according to claim 5, wherein the fins are sandwiched between the backing sheet and a base sheet of the heat exchanger layer.

7. A liner according to claim 1, wherein the acoustic attenuation layer has a cellular honeycomb structure.

8. A liner according to claim 1, wherein the acoustic attenuation layer further has a perforated sheet which overlays the cellular honeycomb structure to form the air-washed surface.

9. A gas turbine engine having an air flow passage lined with one or more liners according to claim 1.

10. A gas turbine engine according to claim 8, wherein the gas turbine engine is a turbofan gas turbine engine and the lined air flow passage is a bypass duct.

* * * * *